3,177,118
CAMPHORATED DERIVATIVES OF 2-AMINO-THIAZOLINE FOR ANALEPTIC AND ANTI-TUSSIVE ACTIVITY

Jacques Louis Edouard Baetz, La Garenne-Colombes, France, assignor to L'Equilibre Biologique, Amilly, Loiret, France, a French body corporate
No Drawing. Filed Aug. 28, 1962, Ser. No. 220,080
Claims priority, application France, Sept. 13, 1961, 873,087
4 Claims. (Cl. 167—65)

The object of the present invention is to provide new camphorated derivatives of 2-amino-2-thiazoline, conventionally referred to hereinafter as 2-aminothiazoline, said derivatives being constituted by the camphorate of 2-aminothiazoline, the campho-carboxylate of 2-aminothiazoline and the campho-sulfonate of 2-aminothiazoline.

These compounds are the salts of 2-aminothiazoline and of an acid derivative of the camphor and constitute new chemical compounds. They possess interesting therapeutic properties as respiratory analeptics and antitussive agents.

Another object of the invention is to provide a process of preparing said compounds.

Said process comprises salifying the corresponding acid derivative of the camphor by means of 2-aminothiazoline by putting the reactants in contact in the presence of a solvent such as water or alcohol.

The following examples are illustrative of the invention:

EXAMPLE 1.—CAMPHORATE OF 2-AMINOTHIAZOLINE

It has for empirical formula $C_{16}H_{28}O_4N_4S_2$ (molecular weight=404) and structural formula:

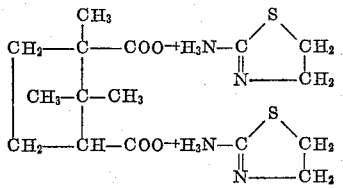

This compound is in the form of a white microcrystalline powder, soluble in water, insoluble in ethanol and ether. The melting point measured with the capillary tube is 186–188° C.

Its preparation can be carried out in the following manner: 40.4 g. of camphoric acid (0.2 mol) and 40.8 g. of 2-aminothiazoline base (0.4 mol) are each dissolved hot in 50 ml. of ethanol. The two solutions are slowly mixed since there is a large amount of heat given off, the salt precipitates immediately, the mixture is filtered on a suction filter after cooling and washed on a filter with ethanol. The minimum yield is 85%.

EXAMPLE 2.—CAMPHO-CARBOXYLATE OF 2-AMINOTHIAZOLINE

It has for empirical formula $C_{14}H_{22}O_3N_2S$ (molecular weight=298) and for structural formula:

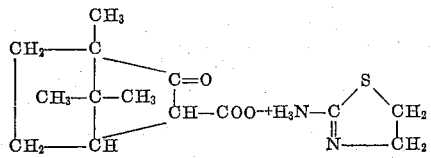

This compound is in the form of a white micro-crystalline powder soluble in water and 95% ethanol, insoluble in ether. The melting point measured with the capillary tube is 138–139° C.

Its preparation can be carried out in the following manner: 19.6 g. of campho-carboxylic acid (0.1 mol) are put in suspension in 25 ml. of water and heated in a water bath, 10.3 g. of 2-aminothiazoline base (0.1 mol) in solution in 20 ml. of water are added; there is thus obtained a complete dissolution of campho-carboxylic acid. The solution is immediately filtered and crystallized by cooling; it is filtered on a suction filter and washed with ethanol. A new fraction is obtained by concentration under a vacuum of the mother waters. The minimum yield is 65%.

EXAMPLE 3.—CAMPHO-SULFONATE OF 2-AMINOTHIAZOLINE

It has for empirical formula $C_{13}H_{22}O_4N_2S_2$ (molecular weight=334) and for structural formula:

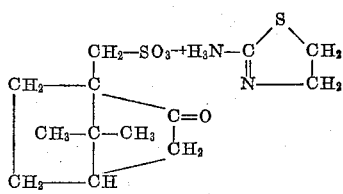

This compound is in the form of a white micro-crystalline powder very soluble in water, soluble in ethanol, insoluble in ether and having a melting point measured with the capillary tube of 178–180° C.

It can be prepared in the following manner: 23.2 g. of campho-sulfonic acid (0.1 mol) are dissolved hot in 20 ml. of ethanol to which are added 10.2 g. of 2-aminothiazoline base (0.1 mol) in solution in 20 ml. of ethanol. The campho-sulfonate of 2-aminothiazoline crystallizes upon cooling, it is filtered in a suction filter and washed with ethanol. A new fraction can be obtained by the addition of ether to the mother waters. The minimum yield is 60%.

The pharmacological study of these compounds reveals the following properties:

(1) *Toxicity*

By the intraperitoneal route in the mouse the $LD_{50}$ of the camphorate of 2-aminothiazoline is in the neighborhood of 350 mg./kg.

Under the same conditions, that of the campho-carbonate of 2-aminothiazoline is in the neighborhood of 400 mg./kg.

Similarly, that of the campho-sulfonate of 2-aminothiazoline is around 550 mg./kg.

(2) *Action in the cardiovascular region*

(a) In the rat by the intravenous route, these three compounds have a hypotensive action; in respect of a dose of 1 mg./kg. the hypotension is in the neighborhood of 3 cm. of mercury and the return to a normal value is very rapid.

(b) In the dog by the intravenous route, these compounds have a tendency to induce a hypertension, and this as soon as the dose of 1 mg./kg. is reached, this hypertension being fugacious and often accompanied by a more or less pronounced bradycardia, depending on the animals. The return to normal is very rapid.

It should be noted that by the subcutaneous route or per os at doses between 20 and 40 mg./kg., no cardiovascular action of these products is observed.

(3) *Action on the respiration*

These three salts of 2-aminothiazoline induce in the rat and in the dog a hyper-ventilation.

In the rat by the subcutaneous route there is observed in the 25 minutes which follow the injection a very large increase in the rhythm and amplitude of the respiration.

In the dog under the same conditions the respiratory effect is of the same kind.

The salts of 2-aminothiazoline have a tendency to increase the consumption of oxygen of the rat anaesthetized with urethane in proportions varying from 15 to 40% depending on the subjects of the experiment.

(4) Action on the smooth muscles

The camphorate, the campho-carbonate and the campho-sulfonate of 2-aminothiazoline have a tendency to induce an exaggeration in the intestinal motivity revealed either in isolated organs or in the anaesthetized dog.

(5) Local anaesthetic action

These three compounds have a slight anaesthetic action on the surface (cornea of the rabbit) and infiltrating action (intradermic injection).

Further, anaesthesia by conduction measured by direct application during a given period of time of either of these three compounds on the sciatic nerves of the rabbit is very easily revealed by the large decrease in the response of the nerve to a constant electrical stimulation.

(6) Antitussive action

The antitussive activity of these three compounds was tested by measuring the number of cough movements induced by ammoniac aerosols: on the one hand, 24 hours after administration of one of these compounds; on the other hand, 1 hour after oral administration of one of these compounds, and lastly, 24 hours after this administration.

These measurements show that the administration per os of 5–10 mg/kg. of one of these salts of 2-aminothiazoline to guinea pigs decreased the cough movements as much as from 45 to 50% one hour after absorption of one of these products, it being still about 30% 24 hours after.

This pharmacological study demonstrates the essentially respiratory analeptic and antitussive action of the camphorate, the campho-carboxylate and the campho-sulfonate of 2-aminothiazoline, which can be advantageously employed in human therapeutics.

In these indications, these compounds can be put in the usual appropriate forms with excipients:

Tablets, syrup, potion for administration per os at the daily dose of 0.2 g. to 1 g. in the adult.

Suppositories containing 50–500 mg. for administration by the rectal route at the rate of 2–3 suppositories daily.

In ampullae containing 20–150 mg. of active principle in 1–5 ml. of distilled water injectable at the rate of 2–4 ampullae daily.

It must be understood that the invention is not intended to be limited to the foregoing merely illustrative examples.

Having now described my invention what I claim as new and desire to secure by Letters Patent is:

1. Process for exerting a respiratory analeptic and antitussive activity in patients comprising administering to these patients a daily dose of 0.2 to 1 g. of a camphorated derivative of 2-amino-2-thiazoline selected from the group consisting of the camphorate of 2-amino-2-thiazoline, the campho-carboxylate of 2-amino-2-thiazoline and the campho-sulfonate of 2-amino-2-thiazoline.

2. Therapeutic composition in unit dosage form, having a respiratory analeptic and antitussive activity, said composition comprising substantially 20 mg. to 500 mg. of a camphorated salt of 2-amino-2-thiazoline, as active principle, said salt being selected from the group consisting of the camphorate of 2-amino-2-thiazoline, the campho-carbonate of 2-amino-2-thiazoline and the campho-sulfonate of 2-amino-2-thiazoline, and a pharmaceutical vehicle.

3. The camphorate of 2-amino-2-thiazoline having the formula:

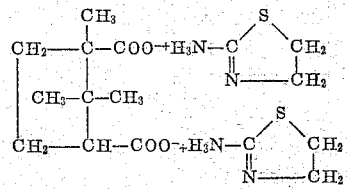

4. The campho-carbonate of 2-amino-2-thiazoline having the formula:

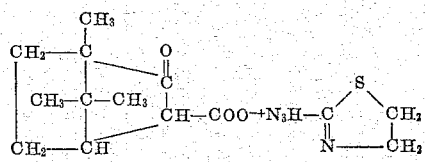

References Cited by the Examiner

UNITED STATES PATENTS 2,219,741  10/40  Hoffmann _____ 260—253
2,491,741  12/49  Ledrut _____ 260—514

OTHER REFERENCES

Elderfield: Heterocyclic Cpds, vol. 5, 1957, John Wiley Inc., page 686.

Little: Chem. Abst., vol. 34, page 3702(7), 1940.

JULIAN S. LEVITT, *Primary Examiner.*

FRANK CACCIAPAGLIA, JR., LEWIS GOTTS,
*Examiners.*